(12) United States Patent
Short

(10) Patent No.: US 7,398,977 B2
(45) Date of Patent: Jul. 15, 2008

(54) SHOPPING CART LINER

(76) Inventor: Diana S. Short, 1391 Highcrest Dr., Medford, OR (US) 97504

( * ) Notice: Subject to any disclaimer, the term of this patent is extended or adjusted under 35 U.S.C. 154(b) by 0 days.

(21) Appl. No.: 11/486,817

(22) Filed: Jul. 14, 2006

(65) Prior Publication Data

US 2008/0012253 A1   Jan. 17, 2008

(51) Int. Cl.
   *B62B 3/02*  (2006.01)
(52) U.S. Cl. ............... 280/33.992; 280/33.991; 280/652; 280/645; 280/47.26; 280/651
(58) Field of Classification Search ............ 280/33.991, 280/33.992, 29, 33.993, 652, 645, 47.26, 280/651; 297/229
See application file for complete search history.

(56) References Cited

U.S. PATENT DOCUMENTS

| | | | | |
|---|---|---|---|---|
| 2,917,094 A | * | 12/1959 | Sullivan | 150/166 |
| 3,028,066 A | * | 4/1962 | Bumby | 220/23.9 |
| 4,560,096 A | | 12/1985 | Lucas et al. | |
| D292,135 S | * | 9/1987 | Grube et al. | D34/24 |
| 4,871,100 A | | 10/1989 | Posner | |
| 4,960,302 A | | 10/1990 | Walters | |
| 5,238,293 A | * | 8/1993 | Gibson | 297/229 |
| 5,358,138 A | | 10/1994 | Karwoski | |
| 5,678,888 A | * | 10/1997 | Sowell et al. | 297/256.17 |
| 5,918,798 A | | 7/1999 | Frahm | |
| 5,988,744 A | * | 11/1999 | Franchak | 297/256.17 |
| 6,129,417 A | | 10/2000 | Cohen-Fyffe | |
| 6,224,152 B1 | * | 5/2001 | Hughes et al. | 297/256.17 |
| 6,237,998 B1 | | 5/2001 | Aprile | |
| 6,428,098 B1 | * | 8/2002 | Allbaugh | 297/219.12 |
| 6,491,996 B2 | * | 12/2002 | Digangi | 428/43 |
| 6,669,289 B1 | | 12/2003 | Hays | |
| 6,702,381 B2 | | 3/2004 | Endicott et al. | |
| 6,848,743 B1 | | 2/2005 | Collins | |
| 6,851,749 B2 | | 2/2005 | Norman | |
| 6,944,981 B1 | | 9/2005 | Garberg et al. | |
| 6,948,725 B2 | | 9/2005 | Sampson et al. | |
| 2006/0001225 A1 | * | 1/2006 | Gurley et al. | 280/33.992 |

* cited by examiner

*Primary Examiner*—Christopher Ellis
*Assistant Examiner*—Cynthia F Collado
(74) *Attorney, Agent, or Firm*—Gerald D. Haynes; R. Keith Harrison

(57) ABSTRACT

A shopping cart liner is disclosed. An illustrative embodiment of the shopping cart liner includes a flexible, plastic liner body having a bottom panel and a rear portion, a pair of side portions and a front portion extending from the bottom panel. In some embodiments, at least one liner partition extends from the bottom panel. A method of preventing contaminants on a shopping cart from contacting items placed in the shopping cart is also disclosed.

16 Claims, 3 Drawing Sheets

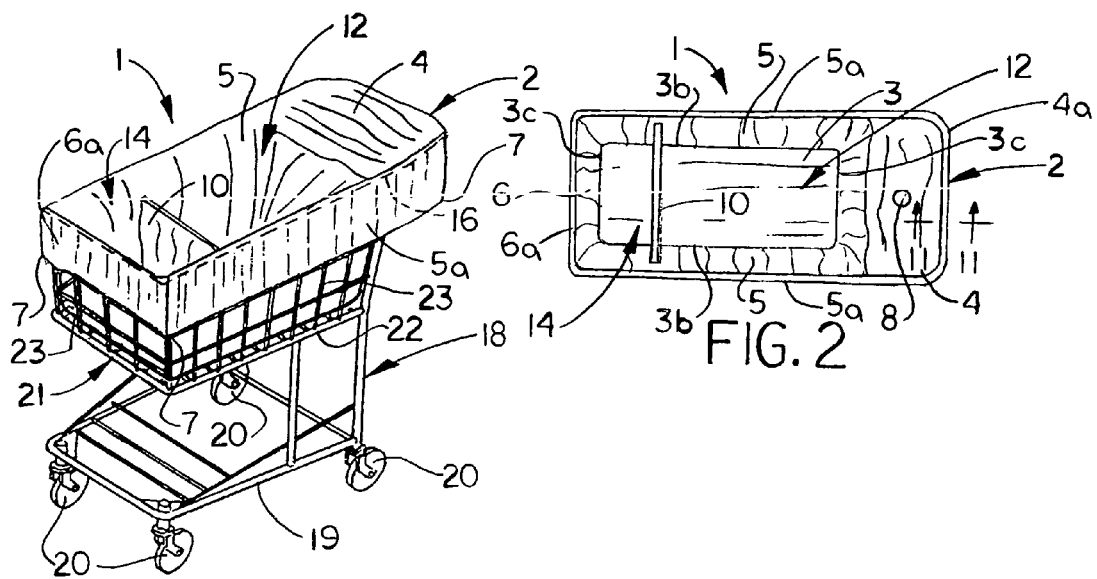
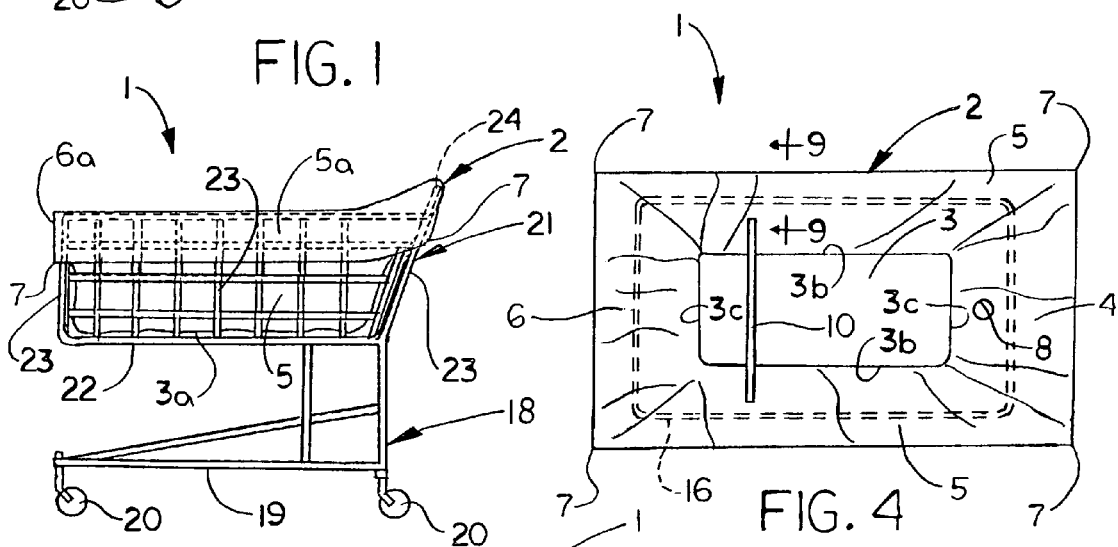
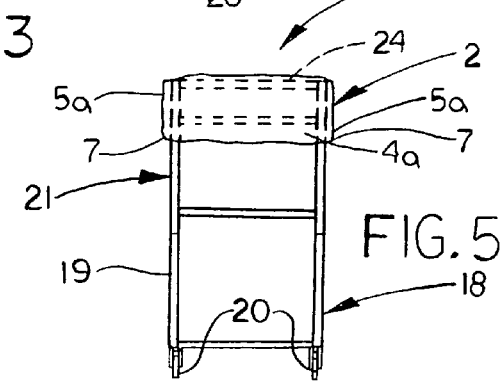

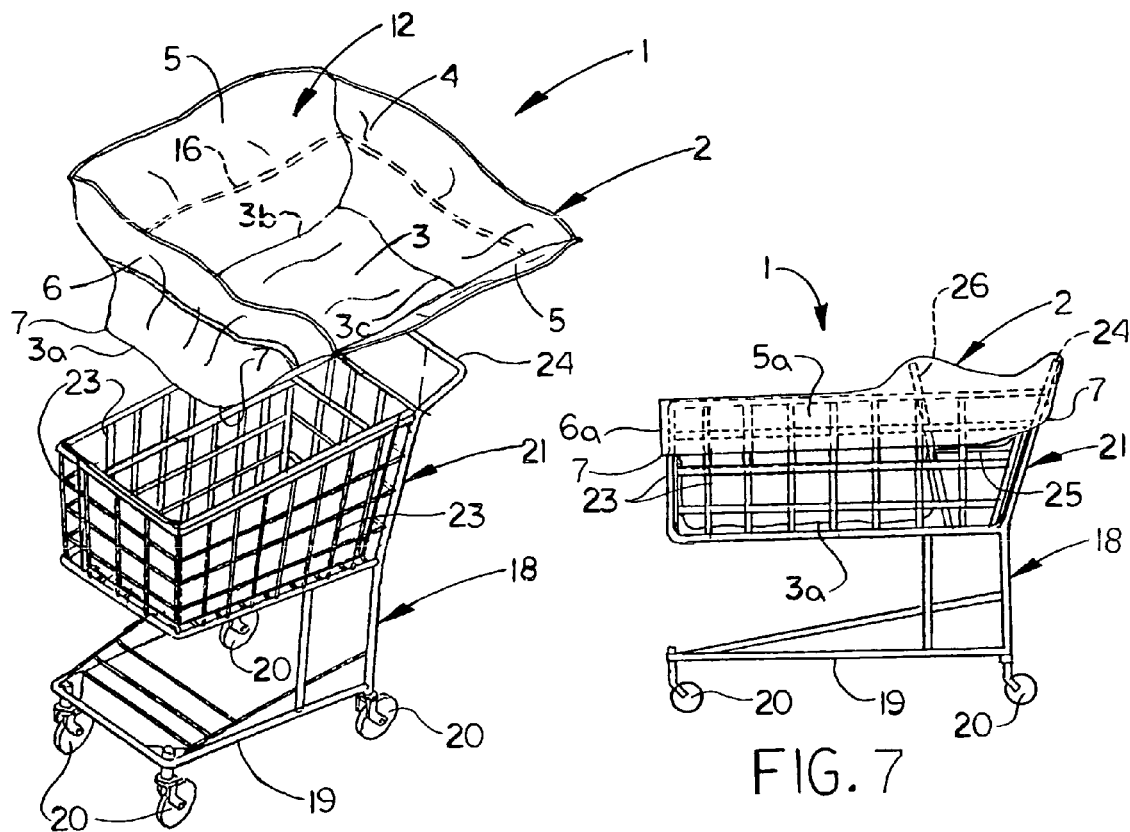
FIG. 6
FIG. 7
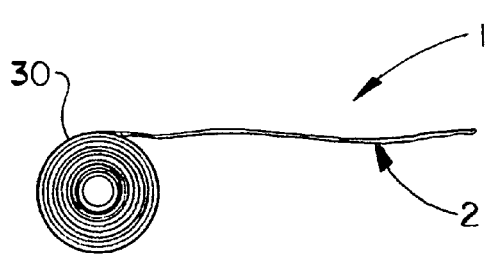
FIG. 8
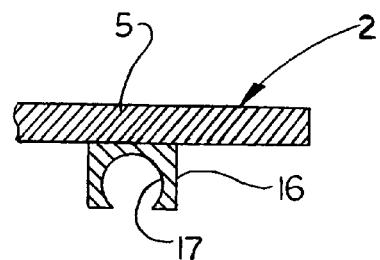
FIG. 9

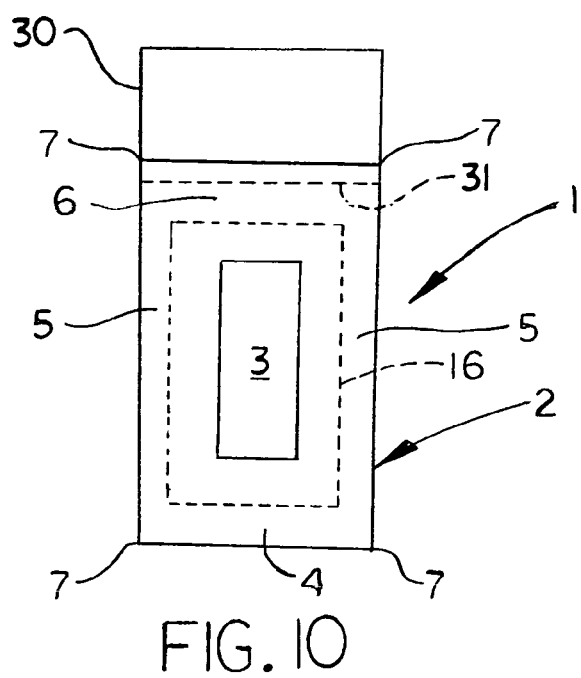
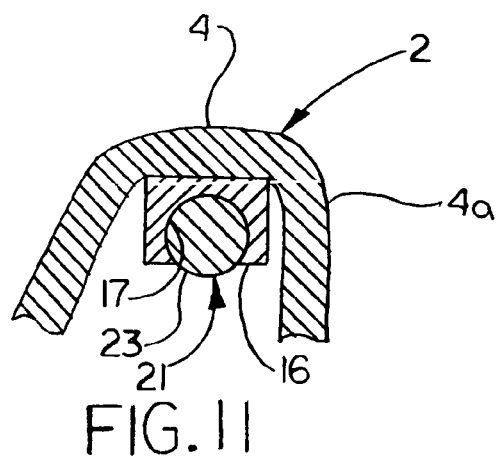
FIG. 10
FIG. 11

SHOPPING CART LINER

FIELD

The present invention relates to liners. More particularly, the present invention relates to a shopping cart liner which is adapted to line a shopping cart.

BACKGROUND

Shopping carts are commonly used in supermarkets to transport groceries and other items to a checkout counter. A typical conventional shopping cart includes a wheeled frame on which is provided a typically metal basket. A handle extends from the basket to enable a user to push the shopping cart throughout the supermarket. An infant seat may be provided on the basket to support an infant during shopping.

During grocery shopping, groceries are placed in the basket. In some cases, solid or liquid food matter can leak onto the basket from packages in which they are contained. If it remains on the basket for a prolonged period of time, the food matter may promote the breeding of bacteria on the basket. The bacteria may potentially contaminate food items which are subsequently placed in the basket. Accordingly, a shopping cart liner is needed which can be placed in a basket of a shopping cart to prevent bacteria on the basket from contaminating food items placed

SUMMARY

The present invention is generally directed to a shopping cart liner. An illustrative embodiment of the shopping cart liner includes a flexible, plastic liner body having a bottom panel and a rear portion, a pair of side portions and a front portion extending from the bottom panel. In some embodiments, at least one liner partition extends from the bottom panel.

The present invention is further generally directed to a method of preventing contaminants on a shopping cart from contacting items placed in the shopping cart. An illustrative embodiment of the method includes providing a shopping cart liner comprising a flexible, plastic liner body having a bottom panel and a rear portion, a pair of side portions and a front portion extending from the bottom panel and at least two liner compartments provided in the liner body; deploying the liner body in the shopping cart; and placing at least one item in at least one of the at least two liner compartments.

BRIEF DESCRIPTION OF THE DRAWINGS

The invention will now be described, by way of example, with reference to the accompanying drawings, in which:

FIG. 1 is a perspective view of an illustrative embodiment of the shopping cart liner, deployed in a functional position in a shopping cart;

FIG. 2 is a top view of an illustrative embodiment of the shopping cart liner, deployed in a functional position in a shopping cart;

FIG. 3 is a side view of an illustrative embodiment of the shopping cart liner, deployed in a shopping cart;

FIG. 4 is a top view of an illustrative embodiment of the shopping cart liner, removed from a shopping cart (not illustrated) and spread out in a non-functional configuration;

FIG. 5 is a rear view of an illustrative embodiment of the shopping cart liner, deployed in a functional position in a shopping cart and covering a handle element (in phantom) of the shopping cart in typical application;

FIG. 6 is an exploded, perspective view of an illustrative embodiment of the shopping cart liner, illustrating typical deployment of the shopping cart liner in a shopping cart;

FIG. 7 is a side view of an illustrative embodiment of the shopping cart liner, deployed in a shopping cart and covering an infant seat and infant seat handlebar elements of the shopping cart in typical application;

FIG. 8 is a side view of a liner roll, with a liner body of an illustrative embodiment of the shopping cart liner extended from the liner roll;

FIG. 9 is a sectional view, taken along section lines 9-9 in FIG. 4, of an attachment lip element of an illustrative embodiment of the shopping cart liner;

FIG. 10 is a top view of a liner roll, with a liner body of an illustrative-embodiment of the shopping cart liner extended from the liner roll; and FIG. 11 is a sectional view, taken along section lines 11-11 in FIG. 2, with the attachment lip element detachably engaging a basket element of a shopping cart in typical application of an illustrative embodiment of the shopping cart liner.

DETAILED DESCRIPTION

Referring to the drawings, an illustrative embodiment of the shopping cart liner is generally indicated by reference numeral 1. The shopping cart liner 1 includes a liner body 2 having a typically flexible, plastic sheet construction and may have any of various colors. The liner body 2 may have a single-layered or multi-layered construction. The liner body 2 includes a bottom panel 3 which typically has a generally elongated, rectangular shape with a bottom surface 3a (FIG. 3), parallel longitudinal edges 3b and parallel transverse edges 3c, as illustrated in FIG. 4. A pair of side portions 5 extends from the respective longitudinal edges 3b of the bottom panel 3. A rear portion 4 and a front portion 6 extend from the respective transverse edges 3c of the bottom panel 3. The rear portion 4, side portions 5 and front portion 6 are typically continuous with each other and have multiple corners 7.

As shown in FIGS. 4 and 9, in some embodiments of the shopping cart liner 1 an attachment lip 16, which is a resilient material such as flexible plastic or rubber, for example, is provided on the liner body 2. The attachment lip 16 may be continuous and typically extends along the rear portion 4, the side portions 5 and the front portion 6 of the liner body 2, generally surrounding the bottom panel 3 of the liner body 2. As illustrated in FIG. 9, a lip channel 17 extends along the attachment lip 16. The attachment lip 16 is generally congruent with the upper edge of a basket 21 on a shopping cart 18 (FIG. 10) in which the liner body 2 is deployed, as will be hereinafter described. The attachment lip 16 facilitates detachable attachment of the liner body 2 to the shopping cart 18, in typical application of the shopping cart liner 1 as will be hereinafter described.

In some embodiments of the shopping cart liner 1, at least one liner partition 10 extends from the bottom panel 3 and typically between the side portions 5 of the liner body 2. Each liner partition 10 may, like the bottom panel 3, rear portion 4, side portions 5 and front portion 6 of the liner body 2, have a flexible, plastic sheet construction. Each liner partition 10 may be molded integrally with the bottom panel 3 and side portions 5, or alternatively, may be glued or otherwise attached to the bottom panel 3 and side portions 5 using techniques known by those skilled in the art. When the shopping cart liner 1 is deployed in a functional configuration, as will be hereinafter described, the liner partition 10 or liner partitions 10 divide(s) the shopping cart liner 1 into at least a rear liner compartment 12 and a front liner compartment 14.

The rear liner compartment 12 and the front liner compartment 14 may have substantially the same volume or different volumes. For example, in the embodiment of the shopping cart liner 1 which is illustrated in FIGS. 1 and 2, the rear liner compartment 12 has a volume which is about 2~3 times the volume of the rear liner compartment 14; however, it is to be understood that in alternative embodiments of the cart liner 1, the rear liner compartment 12 may have a volume which is smaller than or substantially the same as that of the front liner compartment 14. As illustrated in FIGS. 2 and 4, at least one drink holder opening 8 may extend through the liner body 2, such as through the rear portion 4 of the liner body 2, for example.

In typical application, the liner bodies 2 of multiple shopping cart liners 1 can be wound on a liner roll 30, as illustrated in FIGS. 8 and 10, from which the individual liner bodies 2 can be individually and sequentially dispensed for use. The liner bodies 2 of multiple adjacent shopping cart liners 1 are connected to each other through perforations 31, as illustrated in FIG. 10. Each liner body 2 can be separated from the liner roll 30 by individually tearing each terminal liner body 2 from the liner roll 30. It is to be understood that the liner bodies 2 of the shopping cart liner 1 can be packaged and dispensed according to alternative techniques which are known by those skilled in the art.

After it is removed from the liner roll 30, the liner body 2 of the shopping cart liner 1 is deployed in the shopping cart 18, which may be conventional. The shopping cart 18 typically includes a frame 19 having front and rear frame wheels 20. A basket 21, typically having a metal or plastic mesh construction, is provided on the frame 19. The basket 21 typically has a basket bottom 22 and basket sides 23 which extend from the basket bottom 22. A handle 24 is typically provided on a rear portion of the basket 21 to facilitate transport of the shopping cart 18 on the frame wheels 20. As illustrated in FIG. 7, some shopping carts 18 include an infant seat 25 which is provided in the basket 21 and may have a folding design. A handlebar 26 typically extends adjacent to the infant seat 25 for gripping by an infant (not illustrated) as he or she sits on the infant seat 25.

As illustrated in FIG. 6, the shopping cart liner 1 is deployed in the shopping cart 18 typically by extending or unfolding the liner body 2 and inserting the bottom panel 3 of the liner body 2 in the basket 21 until the bottom surface 3a of the bottom panel 3 rests on the basket bottom 22 of the basket 21. As illustrated in FIGS. 1-3 and 5, the rear portion 4 of the liner body 2 is extended over the handle 24 of the shopping cart 18, forming a rear overhanging portion 4a which hangs from the handle 24, as particularly illustrated in FIG. 5. In like manner, the side portions 5 of the liner body 2 are extended over the side edges of the basket 21, forming side overhanging portions 5a. The front portion 6 of the liner body 2 is extended over the front edge of the basket 21, forming a front overhanging portion 6a. As illustrated in FIGS. 1 and 11, the attachment lip 16 on the liner body 2 can be detachably fitted to the basket sides 23 of the basket 21 by inserting the upper frame element which extends along the edge of the basket 21 into the lip channel 17, as illustrated in FIG. 11. This maintains the liner body 2 in a secure position on the basket 21.

Various items (not illustrated), such as grocery items, for example, can be placed in the rear liner compartment 12 and/or the front liner compartment 14. It will be appreciated by those skilled in the art that items which should remain separate, such as fragile items and heavy items, for example, can be placed separately in the rear liner compartment 12 and the front liner compartment 14. Accordingly, the liner partition 10 prevents the heavy items in one of the rear liner compartment 12 and the front liner compartment 14 from breaking or crushing the fragile items in the other of the rear liner compartment 12 and the front liner compartment 14. Alternatively, one of the rear liner compartment 12 and the front liner compartment 14 may be used to contain food items and the other of the rear liner compartment 12 and the front liner compartment 14 used to store potentially hazardous or poisonous materials such as insect repellent and/or pest control substances, for example. A drink container (not illustrated) can be inserted in the drink holder opening 8 to support a beverage (not illustrated) during use of the shopping cart 18. As illustrated in FIG. 7, under circumstances in which the shopping cart 18 includes the infant seat 25 and handlebar 26, the rear portion 4 of the liner body 2 covers the infant seat 25. The liner body 2 prevents food matter and/or bacteria which may remain on the basket 21 from previous use from contacting food items placed in the rear liner compartment 12 and/or the front liner compartment 14. After use of the shopping cart 1, when groceries and other items have been removed from the rear liner compartment 12 and/or front liner compartment 14, the attachment lip 16 of the liner body 2 is detached from the basket 21 of the shopping cart 18 and the liner body 2 is discarded.

While the preferred embodiments of the invention have been described above, it will be recognized and understood that various modifications can be made in the invention and the appended claims are intended to cover all such modifications which may fall within the spirit and scope of the invention.

What is claimed is:

1. A shopping cart liner, comprising:
    a flexible, plastic liner body having a bottom panel;
    a rear portion, a pair of side portions and a front portion extending from said bottom panel;
    at least one liner partition extending from said bottom panel;
    an elongated, rectangular attachment lip carried by said liner body and extending along a perimeter of said liner body; and
    a lip channel provided in said attachment lip.

2. The shopping cart liner of claim 1 further comprising at least one drink holder opening extending through said liner body.

3. The shopping cart liner of claim 1 wherein said attachment lip extends along said rear portion, said pair of side portions and said front portion of said liner body and generally surrounds said bottom panel.

4. The shopping cart liner of claim 1 wherein said attachment lip is continuous.

5. The shopping cart liner of claim 1 wherein said bottom panel has a generally elongated, rectangular configuration.

6. The shopping cart liner of claim 1 further comprising a plurality of said liner body and a plurality of perforations connecting said plurality of said liner body to each other, and wherein said plurality of said liner body is wound on a liner roll.

7. The shopping cart liner of claim 1 wherein said at least one liner partition extends between said pair of side portions of said liner body.

8. A shopping cart liner, comprising:
    a flexible, plastic liner body having a bottom panel;
    a rear portion, a pair of side portions and a front portion extending from said bottom panel;
    at least one drink holder opening provided in said liner body;

an elongated, rectangular attachment lip carried by said liner body and extending along a perimeter of said liner body;

wherein said attachment lip extends along said rear portion, said pair of side portions and said front portion of said liner body and generally surrounds said bottom panel; and a lip channel provided in said attachment lip.

9. The shopping cart liner of claim 8 further comprising a plurality of liner compartments provided in said liner body.

10. The shopping cart liner of claim 8 wherein said bottom panel has a generally elongated, rectangular configuration.

11. The shopping cart liner of claim 8 further comprising a plurality of said liner body and a plurality of perforations connecting said plurality of said liner body to each other, and wherein said plurality of said liner body is wound on a liner roll.

12. The shopping cart liner of claim 8 wherein said rear portion, a pair of side portions and a front portion extending from said bottom panel are continuous with each other.

13. A method of preventing contaminants on a shopping cart from contacting items placed in the shopping cart, comprising:

providing a shopping cart liner comprising a flexible, plastic liner body having a bottom panel and a rear portion, a pair of side portions and a front portion extending from said bottom panel and at least two liner compartments provided in said liner body and an elongated, rectangular attachment lip having a lip channel provided on said liner body along a perimeter of said liner body;

deploying said liner body in said shopping cart; and placing at least one item in at least one of said at least two liner compartments.

14. The method of claim 13 wherein said deploying said liner body in said shopping cart comprises attaching said attachment lip to said shopping cart.

15. The method of claim 13 further comprising at least one drink holder opening provided in said liner body.

16. The method of claim 13 further comprising at least one liner partition extending from said bottom panel and between said pair of side portions of said liner body and separating said at least two liner compartments from each other.

\* \* \* \* \*